(12) United States Patent
Okumura

(10) Patent No.: US 10,133,552 B2
(45) Date of Patent: Nov. 20, 2018

(54) DATA STORAGE METHOD, TERNARY INNER PRODUCT OPERATION CIRCUIT, SEMICONDUCTOR DEVICE INCLUDING THE SAME, AND TERNARY INNER PRODUCT ARITHMETIC PROCESSING PROGRAM

(71) Applicant: Renesas Electronics Corporation, Kawasaki-shi (JP)

(72) Inventor: Shunsuke Okumura, Kawasaki (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 145 days.

(21) Appl. No.: 14/797,104

(22) Filed: Jul. 11, 2015

(65) Prior Publication Data
US 2016/0054979 A1 Feb. 25, 2016

(30) Foreign Application Priority Data
Aug. 22, 2014 (JP) .................. 2014-169635

(51) Int. Cl.
*G06F 7/49* (2006.01)

(52) U.S. Cl.
CPC ..................... *G06F 7/49* (2013.01)

(58) Field of Classification Search
CPC .......................................................... G06F 7/49
See application file for complete search history.

(56) References Cited

U.S. PATENT DOCUMENTS

| | | | | |
|---|---|---|---|---|
| 4,628,472 A * | 12/1986 | Fensch | .................. | G06F 7/4824 708/493 |
| 4,985,861 A * | 1/1991 | Yamashina | ........... | G06F 7/4824 708/493 |
| 5,822,233 A * | 10/1998 | Kawasaki | ................. | G06F 7/49 708/492 |
| 5,931,893 A * | 8/1999 | Dent | ....................... | G06F 17/15 375/E1.008 |
| 6,232,894 B1 * | 5/2001 | Kawasaki | ............... | H03M 7/06 341/83 |
| 7,562,106 B2 * | 7/2009 | Lablans | .................... | G06F 7/49 708/493 |
| 7,711,761 B2 * | 5/2010 | Lo Iacono | ............ | G06F 7/4824 708/204 |
| 2015/0278156 A1 * | 10/2015 | Ambai | .................... | G06F 17/10 706/12 |
| 2016/0054979 A1 * | 2/2016 | Okumura | .................. | G06F 7/49 708/620 |

FOREIGN PATENT DOCUMENTS

| JP | S 59-3550 A | 1/1984 |
|---|---|---|
| JP | H 07-93545 A | 4/1995 |
| JP | 2001-265779 A | 9/2001 |
| JP | 2002-014804 A | 1/2002 |

OTHER PUBLICATIONS

Japanese Office Action, dated Jan. 23, 2018, in Japanese Application No. 2014-169635 and English Translation thereof.

* cited by examiner

*Primary Examiner* — David H Malzahn
(74) *Attorney, Agent, or Firm* — McGinn I. P. Law Group, PLLC.

(57) ABSTRACT

A data storage method includes storing a plurality of pieces of 2-bit wide ternary data in one word, each of the plurality of pieces of 2-bit wide ternary data indicating +1 when a first bit indicates a first value, indicating −1 when a second bit indicates the first value, and indicating 0 when both the first bit and the second bit indicate a second value.

6 Claims, 18 Drawing Sheets

```
1.    LOOP:   ld r0 r1 r2
2.            ld r3 r4 r2
3.            mult3 r5 r0 r3
4.            and r6 r5 0x5555
5.            and r7 r5 0xAAAA
6.            bcount r8 r6
7.            bcount r9 r7
8.            sub r10 r8 r9
9.            add r11 r10 r11
10.           add r2 r2 1
11.           bne r2 r12 LOOP
```

Fig. 9

| | |
|---|---|
| 1. LOOP: | ld r0 r1 r2 |
| 2. | ld r3 r4 r2 |
| 3. | mult3 r5 r0 r3 |
| 4. | and r6 r5 0x5555 |
| 5. | and r7 r5 0xAAAA |
| 6. | bcount r8 r6 |
| 7. | bcount r9 r7 |
| 8. | sub r10 r8 r9 |
| 9. | add r11 r10 r11 |
| 10. | add r2 r2 1 |
| 11. | bne r2 r12 LOOP |

REGISTER VALUE 1. r0=0x502A=0b0101000000101010  (≡( 1,  1,  0,  0,  0, −1, −1, −1))
2. r3=0x9851=0b1001100001100001  (≡(−1,  1, −1,  0,  1,  0,  1,  1))
3. r5=0x9012=0b1001000000010010  (≡(−1,  1,  0,  0,  0,  0, +1,  0, −1))
4. r0=0x1010
5. r3=0x8001
6. r5=2
7. r6=2
8. r0=0

Fig. 10

| | | |
|---|---|---|
| 1. | LOOP: | ld r0 r1 r2 |
| 2. | | ld r3 r4 r2 |
| 3. | | mult3 r5 r0 r3 |
| 4. | | bcountE r6 r5 |
| 5. | | bcountO r7 r5 |
| 6. | | sub r8 r6 r7 |
| 7. | | add r9 r8 r9 |
| 8. | | add r2 r2 1 |
| 9. | | bne r2 r10 LOOP |

Fig. 15

Fig. 18
```
1.  LOOP:  ld r0 r1 r2
2.         ld r3 r4 r2
3.         mult3 r5 r0 r3
4.         bcount3 r6 r5
5.         add r7 r6 r7
6.         add r2 r2 1
7.         bne r2 r8 LOOP
```
Fig. 19
$x = (-1, 0, 1)^N = (x_{N-1}, \ldots, x_1, x_0)$
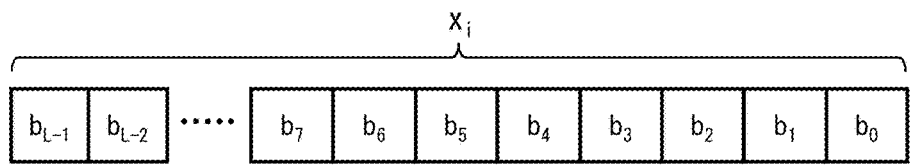
Fig. 20
$x = (-1, 0, 1)^{32} = (x_{31}, \ldots, x_1, x_0)$
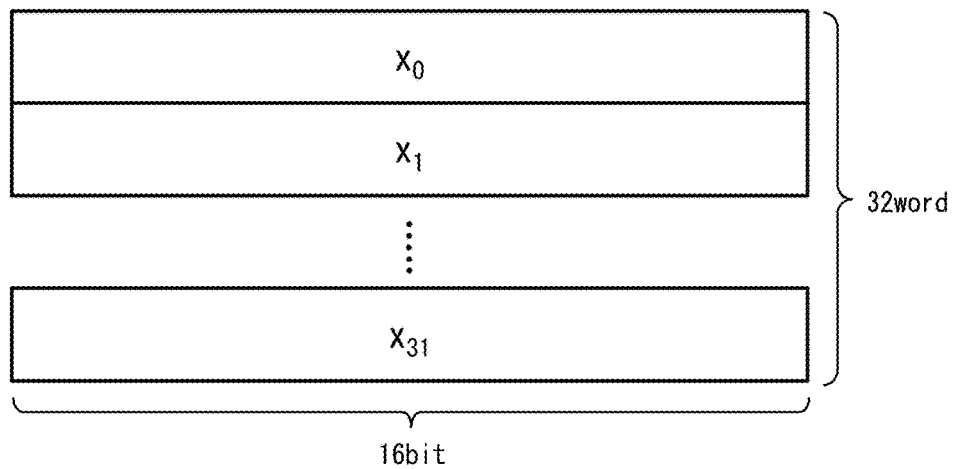

```
1.  LOOP:  ld r0 r1 r2
2.         ld r3 r4 r2
3.         mult r5 r0 r3
4.         add r6 r5 r6
5.         add r2 r2 1
6.         bne r2 r7 LOOP
```

DATA STORAGE METHOD, TERNARY INNER PRODUCT OPERATION CIRCUIT, SEMICONDUCTOR DEVICE INCLUDING THE SAME, AND TERNARY INNER PRODUCT ARITHMETIC PROCESSING PROGRAM

CROSS-REFERENCE TO RELATED APPLICATIONS

This application is based upon and claims the benefit of priority from Japanese patent application No. 2014-169635, filed on Aug. 22, 2014, the disclosure of which is incorporated herein in its entirety by reference.

BACKGROUND

The present invention relates to a data storage method, a ternary inner product operation circuit, a semiconductor device including the same, and a ternary inner product arithmetic processing program.

In recent years, an electronic control system installed in a vehicle includes an image recognition processor that recognizes images taken by a camera or the like. The electronic control system determines, for example, whether an obstacle is approaching based on the result of the recognition by the image recognition processor to perform an automatic control or the like of the brake.

The image recognition processor creates quantized data (so-called feature amount data) based on the array of pixel data obtained from an input image. The image recognition processor creates, for example, a histogram in which a direction component of an edge image obtained from the input image is indicated for each angle (histogram of oriented gradients) as the feature amount data. The image recognition processor then carries out an inner product operation of the feature amount data that is created and dictionary data obtained by machine learning in advance to determine whether the input image includes an object to be detected based on the result of the inner product operation.

It is required in the image recognition processor to process the inner product operation with high accuracy at high speed in order to improve the processing performance of the electronic control system.

According to the configuration in which the inner product operation is carried out using floating point type data for the purpose of improving the accuracy, however, the processing speed decreases. Meanwhile, according to the configuration in which the inner product operation is carried out using binary data represented by 1 and 0 for the purpose of improving the processing speed, the accuracy decreases.

In recent years, development of an image recognition processor that carries out an inner product operation using data represented by ternary values of +1, 0, and −1 (hereinafter also referred to as ternary data) has been advancing. According to the configuration that carries out the inner product operation using the ternary data, it is possible to improve the accuracy compared to the case in which the inner product operation is carried out using the binary data and to improve the processing speed compared to the case in which the inner product operation is carried out using the floating point type data. The operation of the ternary data is also disclosed, for example, in Japanese Unexamined Patent Application Publication No. 2002-14804.

SUMMARY

According to the configuration of the related art that carries out the inner product operation using the ternary data, however, one piece of ternary data that can be expressed by two bits is generally stored in a multiple-bit wide one word in such a way that the ternary data is expressed by a multiple-bit width. Therefore, according to the configuration of the related art, it is impossible to efficiently process the operation of the plurality of pieces of ternary data.

A configuration in Japanese Unexamined Patent Application Publication No. 2002-14804 carries out an operation of ternary data using a plurality of full adders in order to prevent a decrease in the processing speed according to a delay when a carry signal is transferred and does not assume an inner product operation of data formed of a plurality of pieces of ternary data. It is therefore impossible, also with the configuration in Japanese Unexamined Patent Application Publication No. 2002-14804, to efficiently process the operation of the plurality of pieces of ternary data.

Other problems and novel characteristics will be apparent from the description of this specification and the accompanying drawings.

According to one embodiment, a data storage method includes storing a plurality of pieces of 2-bit wide ternary data in one word, each of the plurality of pieces of 2-bit wide ternary data indicating +1 when a first bit indicates a first value, indicating −1 when a second bit indicates the first value, and indicating 0 when both the first bit and the second bit indicate a second value.

According to another embodiment, a ternary inner product operation circuit includes a ternary multiplication unit that performs multiplication of a plurality of pieces of ternary data of each of first and second input data formed by storing a plurality of pieces of 2-bit wide ternary data in one word, and a number obtained by subtracting the number of pieces of ternary data indicating −1 from the number of pieces of ternary data indicating +1 of the plurality of pieces of ternary data forming the result of the multiplication in the ternary multiplication unit is output as an inner product operation result.

According to another embodiment, a ternary inner product arithmetic processing program causes a computer to execute the following processing of: multiplication processing that executes multiplication of a plurality of pieces of ternary data of each of first and second input data formed by storing a plurality of pieces of 2-bit wide ternary data in one word; first count processing that counts the number of pieces of ternary data indicating +1 of a plurality of pieces of ternary data forming a result of the multiplication; second count processing that counts the number of pieces of ternary data indicating −1 of the plurality of pieces of ternary data forming the result of the multiplication; and subtraction processing that subtracts the number of pieces of the ternary data indicating −1 from the number of pieces of the ternary data indicating +1.

According to the embodiments stated above, it is possible to provide a data storage method, a ternary inner product operation circuit, a semiconductor device including the same, and a ternary inner product arithmetic processing program capable of efficiently processing the operation of a plurality of pieces of ternary data.

BRIEF DESCRIPTION OF THE DRAWINGS

The above and other aspects, advantages and features will be more apparent from the following description of certain embodiments taken in conjunction with the accompanying drawings, in which:

FIG. 9 is an assembly program regarding ternary inner product arithmetic processing by the image recognition processor shown in FIG. 6;

FIG. 10 is a diagram showing a specific example of the ternary inner product arithmetic processing by the image recognition processor shown in FIG. 6;

FIG. 15 is an assembly program regarding ternary inner product arithmetic processing by the image recognition processor shown in FIG. 13;

FIG. 18 is an assembly program regarding ternary inner product arithmetic processing by the image recognition processor shown in FIG. 16;

FIG. 19 is a diagram showing a ternary data storage method according to a related art;

FIG. 20 is a diagram showing a specific example of the ternary data storage method according to the related art;

DETAILED DESCRIPTION

Figure 1:
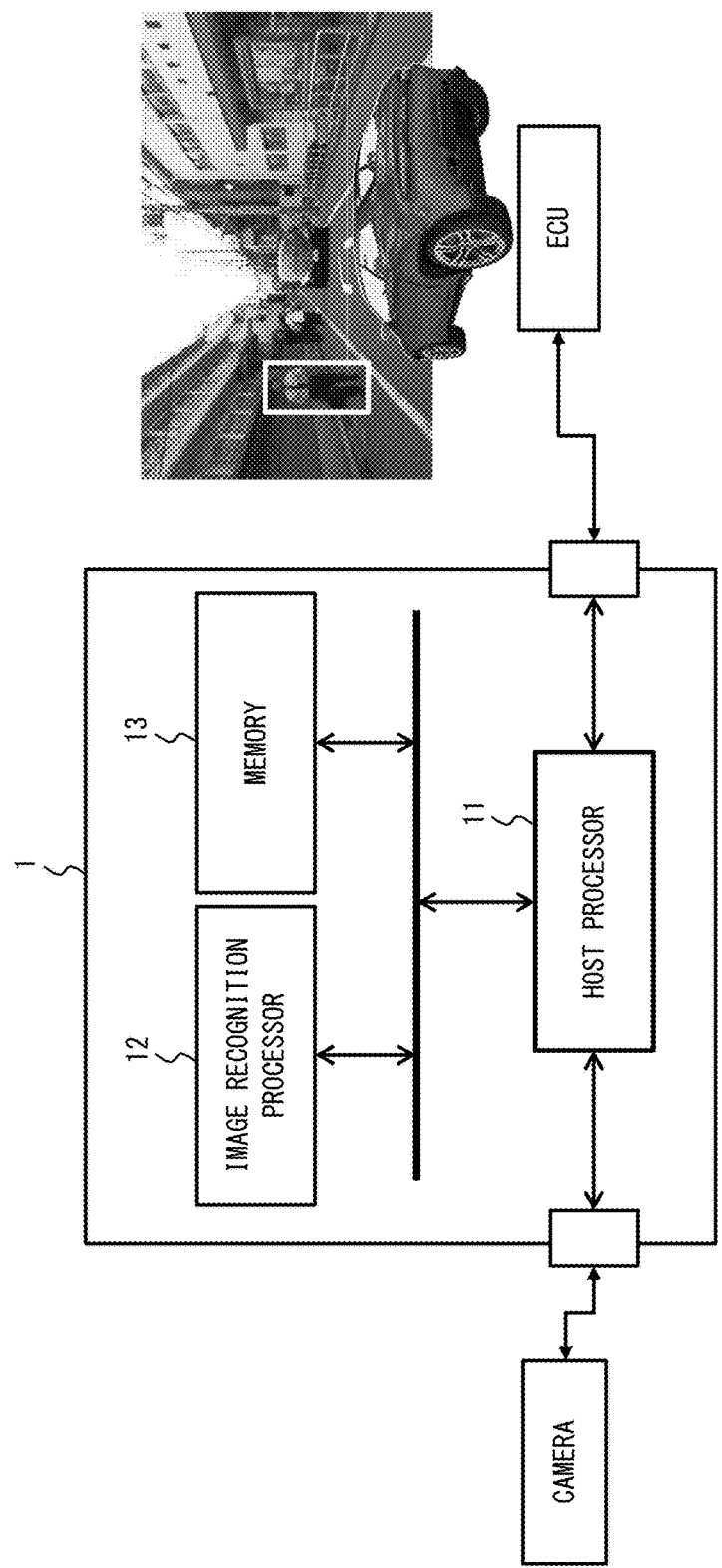
FIG. 1 is a block diagram showing an image recognition device according to a first embodiment.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Hereinafter, embodiments of the present invention will be described with reference to the accompanying drawings. The drawings are in simplified form, and the technical scope of the embodiments of the present invention should not be interpreted to be limited to the drawings. The same elements are denoted by the same reference numerals, and a repeated explanation is omitted.

The invention will be described by being divided into a plurality of sections or embodiments whenever circumstances require it for convenience in the following embodiments. However, unless otherwise specified in particular, they are not irrelevant to one another. One thereof has to do with modifications, applications, details, supplementary explanations, and the like of some or all of the other. When reference is made to the number of elements or the like (including the number of pieces, numerical values, quantity, range, etc.) in the following embodiments, the number thereof is not limited to a specific number and may be greater than or less than or equal to the specific number unless otherwise specified in particular and definitely limited to the specific number in principle.

Further, in the following embodiments, components (including operation steps, etc.) are not always essential unless otherwise specified in particular and considered to be definitely essential in principle. Similarly, when reference is made to the shapes, positional relations, and the like of the components or the like in the following embodiments, they will include ones substantially approximate or similar to their shapes or the like unless otherwise specified in particular and considered not to be definitely so in principle, for example. This is similarly applied even to the above-described number or the like (including the number of pieces, numerical values, quantity, range, etc.).

First Embodiment

FIG. 1 shows a diagram showing an image recognition device (semiconductor device) 1 according to a first embodiment.

As shown in FIG. 1, the image recognition device 1 is installed in, for example, a vehicle, and at least includes a host processor 11, an image recognition processor (ternary inner product operation circuit) 12, and a memory 13.

The host processor 11 controls various processing in the image recognition device 1, accesses and the like to the image recognition processor 12 and the memory 13. For example, the host processor 11 causes the memory 13 to store an image captured by a camera or the like and causes the image recognition processor 12 to recognize the image stored in the memory 13.

The image recognition processor 12 is a processor that recognizes the image captured by the camera or the like.

Figure 2:
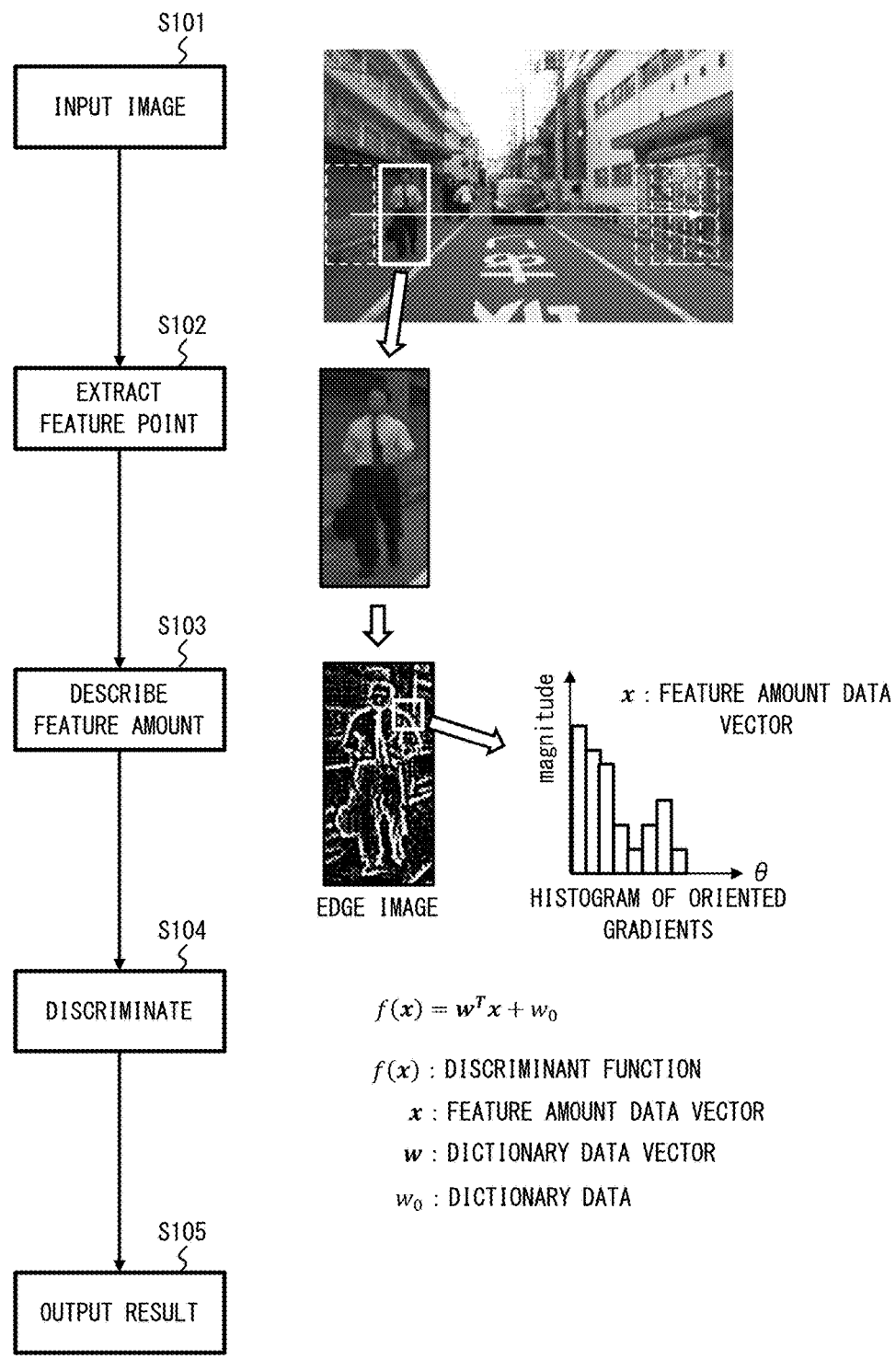
FIG. 2 is a flowchart showing an operation of an image recognition processor provided in the image recognition device shown in FIG. 1.

FIG. 2 is a flowchart showing an operation of the image recognition processor 12.

As shown in FIG. 2, the image recognition processor 12 receives the image captured by the camera or the like (Step S101).

After that, the image recognition processor 12 selects from the received image areas for creating feature amount data (Step S102). While the image recognition processor 12 sequentially selects the areas from one end to the other end of the image, it is not limited to this example. The image recognition processor 12 may select the areas, for example, based on a specific algorithm.

After that, the image recognition processor 12 creates quantized data (so-called feature amount data) based on the array of the pixel data obtained from the image in the selected area (Step S103). In the example shown in FIG. 2, the image recognition processor 12 creates a histogram in which a direction component of an edge image obtained from the image in the selected area is indicated for each angle (histogram of oriented gradients) as the feature amount data.

The image recognition processor 12 carries out the inner product operation of the feature amount data that is created and dictionary data obtained by machine learning in advance to determine whether the input image includes an object to be detected based on the result of the inner product operation (Step S104). Specifically, it is determined, for example, whether an obstacle is approaching.

When f(x) denotes a discriminant function, x denotes a feature amount data vector, w denotes a dictionary data vector, and $w_0$ denotes the dictionary data, the following Expression (1) is established.

[Expression 1]

$$f(X) = w^T x + w_0 \quad (1)$$

The result of the recognition in the image recognition processor 12 is transmitted to, for example, an electronic control unit (ECU) (Step S105). The electronic control unit determines whether an obstacle is approaching based on the result of the recognition in the image recognition processor 12 and performs automatic control of the brake or the like.

The image recognition processor 12 converts each element of the feature amount data expressed by a real number (each direction component of the histogram of oriented gradients) into 2-bit wide ternary data and then collectively stores a plurality of pieces of 2-bit wide ternary data in one word.

While the case in which the image recognition processor 12 converts each element of the feature amount data into 2-bit wide ternary data and then collectively stores the plurality of pieces of 2-bit wide ternary data in one word has been described as an example in this embodiment, the present invention is not limited to this example. The 2-bit wide ternary data may be collectively stored in one word before ternary inner product arithmetic processing by any desired means.

Further, while a case in which the plurality of pieces of 2-bit wide ternary data are stored in a register allocated to one word will be described in this embodiment, the present invention is not limited to this case. In the case of an assembly language level, for example, the plurality of pieces of 2-bit wide ternary data are stored according to any desired data format in each language. The word means a minimum unit of an amount of data concurrently processed in the image recognition processor 12. The word length means the number of bits (bit width) of the word.

Figure 3:
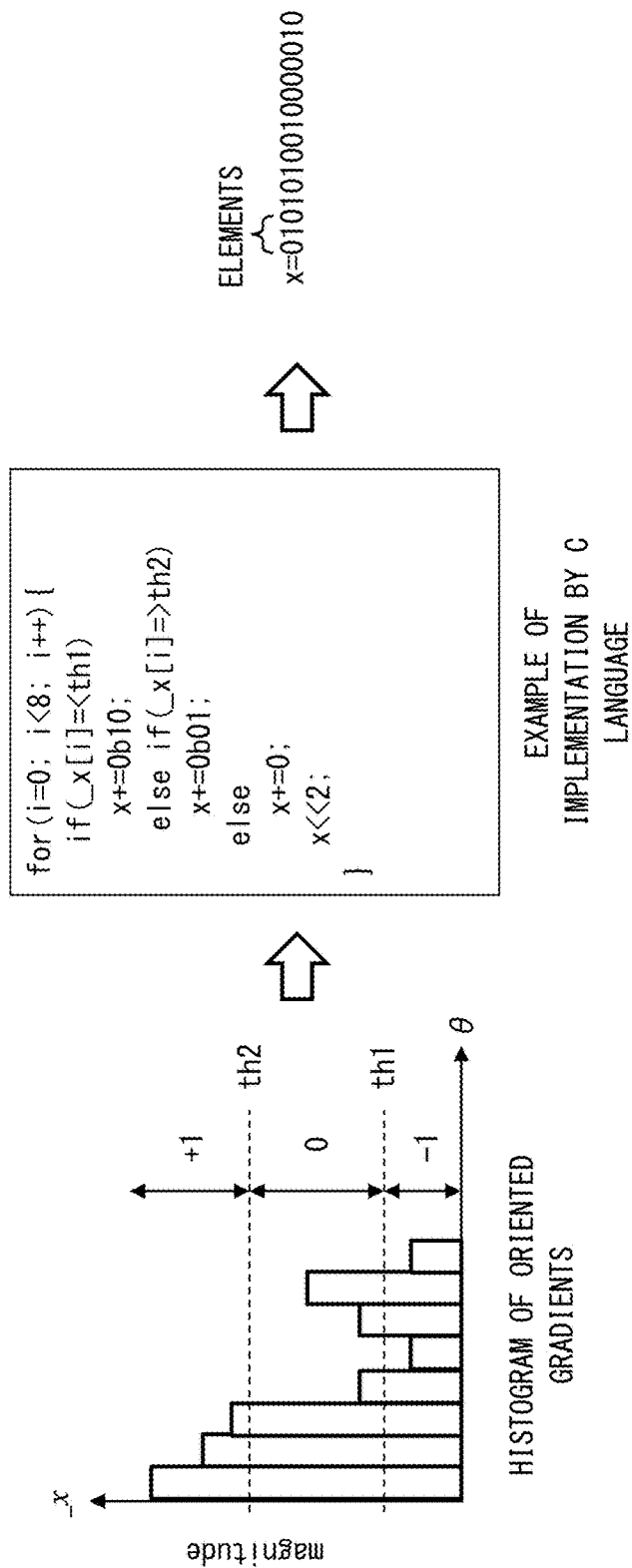
FIG. 3 is a diagram for describing a flow from the time at which feature amount data is converted into ternary data to the time at which the ternary data is stored in a word.

FIG. 3 is a diagram for describing a flow from the time at which the feature amount data is converted into ternary data to the time at which the ternary data is stored in a word.

As shown in FIG. 3, the image recognition processor 12 compares each direction component (each element of the feature amount data) of the histogram of oriented gradients expressed by a real number with thresholds th1 and th2 (th1<th2) to convert the direction component equal to or larger than the threshold th2 to a value "+1", the direction component equal to or larger than the threshold th1 but smaller than the threshold th2 to a value "0", and the direction component smaller than the threshold th1 to a value "−1". These ternary data +1, 0, and −1 are respectively expressed by 2-bit wide binary digits "01", "00", and "10". More specifically, in the case of the ternary data indicating +1, the lower bit of the 2-bit wide binary digit indicates 1 (first value). In the case of the ternary data indicating −1, the higher bit of the 2-bit wide binary digit indicates 1 (first value). In the case of the ternary data indicating 0, both the higher bit and the lower bit of the 2-bit wide binary digit indicate 0 (second value). The image recognition processor 12 collectively stores the plurality of pieces of 2-bit wide ternary data in one word.

In the example shown in FIG. 3, the number of direction components of the histogram of oriented gradients is eight (the number of elements is eight) and the word length is 16 bits. Therefore, each of the eight direction components is converted into 2-bit wide ternary data and then collectively stored in a 16-bit wide one word.

In the following description, a ternary data storage method according to this embodiment will be described further in detail.

Figure 4:
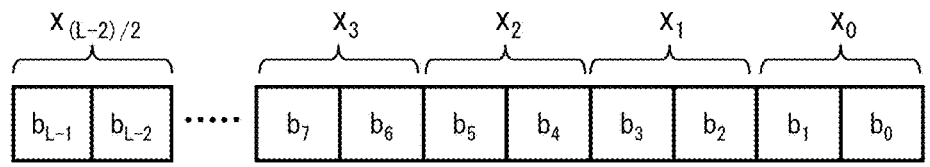
FIG. 4 is a diagram showing a ternary data storage method according to the first embodiment.

FIG. 4 is a diagram showing the ternary data storage method according to this embodiment.

As shown in FIG. 4, the input data (e.g., feature amount data) is expressed by a data array X including N (N is an integer of 1 or larger) pieces of ternary data (elements). Further, the word length is L (L is an integer of two or larger) bits. In this example, a case in which 2N≤L will be described.

For example, one of the 2-bit wide binary digits "01", "00", and "10" respectively corresponding to the values +1, 0, and −1 is stored in the 0-th bit $b_0$ and the first bit $b_1$ of the word as the 0-th ternary data $X_0$. As the first ternary data $X_1$, one of the 2-bit wide binary digits "01", "00", and "10" respectively corresponding to the values +1, 0, and −1 is stored in the second bit $b_2$ and the third bit $b_3$ of the word. In a similar way, as each of the second to (N−1)-th ternary data $X_2$ to $X_{N-1}$, one of the 2-bit wide binary digits "01", "00", and "10" respectively corresponding to the values +1, 0, and −1 is stored in the corresponding two bits of the word. In this way, N pieces of 2-bit wide ternary data are collectively stored in the L-bit wide one word.

As stated above, by storing the plurality of pieces of 2-bit wide ternary data (elements) in one word, this plurality of pieces of ternary data can be processed simultaneously in the image recognition processor 12. Therefore, the image recognition processor 12 is able to efficiently process the operation of the plurality of pieces of ternary data (specifically, the inner product operation).

Figure 5:
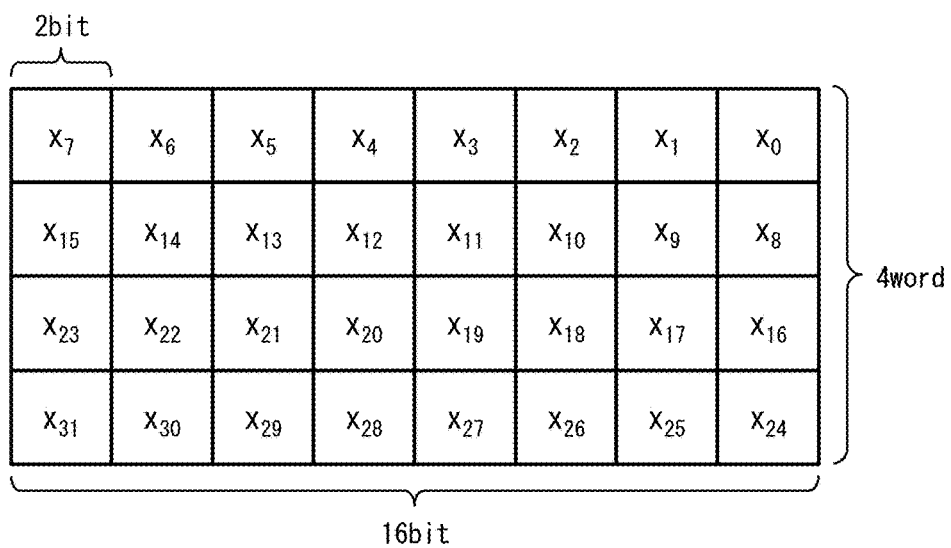
FIG. 5 is a diagram showing a specific example of the ternary data storage method according to the first embodiment.

FIG. 5 is a diagram showing a specific example of the ternary data storage method according to this embodiment. In this example, a case in which the number of elements N is 32 and the word length L is 16, that is, 2N>L, will be described.

As shown in FIG. 5, the data array X of the input data includes 32 pieces of ternary data $X_0$ to $X_{31}$. In this example, the 32 pieces of 2-bit wide ternary data $X_0$ to $X_{31}$ are stored after being divided into four 16-bit wide words. More specifically, eight pieces of 2-bit wide ternary data $X_0$ to $X_7$ are stored in the first 16-bit wide word, eight pieces of 2-bit wide ternary data $X_8$ to $X_{15}$ are stored in the second 16-bit wide word, eight pieces of 2-bit wide ternary data $X_{16}$ to $X_{23}$ are stored in the third 16-bit wide word, and eight pieces of 2-bit wide ternary data $X_{24}$ to $X_{31}$ are stored in the fourth 16-bit wide word.

(Data Storage Method According to Related Art)

FIG. 19 is a diagram showing a ternary data storage method according to a related art.

As shown in FIG. 19, input data is expressed by a data array X including N (N is an integer of 1 or larger) pieces of ternary data (elements). Further, the word length is L (L is an integer of two or larger) bits.

According to the configuration in the related art, one of L-bit wide values "00 . . . 00000001", "00 . . . 00000000", and "11 . . . 11111111" respectively corresponding to the values +1, 0, and −1 is stored in the L-bit wide one word as i (i is any integer from 0 to N−1)-th ternary data Xi. That is, only one piece of ternary data (element) is stored in one word.

FIG. 20 is a diagram showing a specific example of the ternary data storage method according to the related art. In this example, a case in which the number of elements N is 32 and the word length L is 16 will be described.

As shown in FIG. 20, the data array X of the input data includes 32 pieces of ternary data $X_0$ to $X_{31}$. In this case, the 32 pieces of ternary data $X_0$ to $X_{31}$ are stored in the respective 32 words. In such a configuration, it is impossible to concurrently process the plurality of pieces of ternary data and to efficiently process the operation of the plurality of pieces of ternary data (specifically, the inner product operation).

(Configuration of Image Recognition Processor 12)

Figure 6:
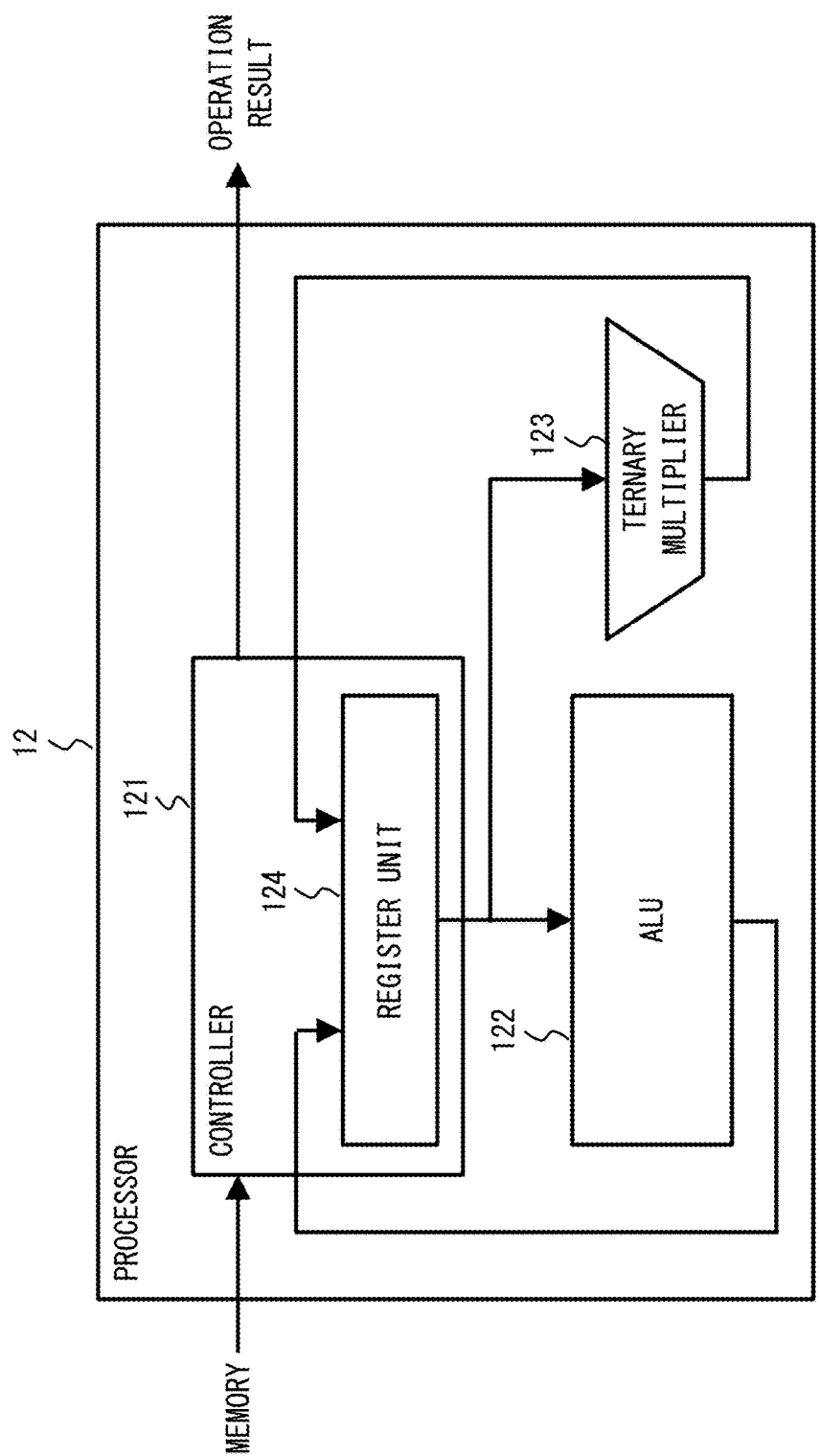
FIG. 6 is a block diagram showing the image recognition processor according to the first embodiment.

FIG. 6 is a block diagram showing a configuration of the image recognition processor 12.

As shown in FIG. 6, the image recognition processor 12 is formed on a semiconductor substrate using a CMOS manufacturing process, executes operation processing based on instruction data and the input data (e.g., feature amount data) stored in the memory 13, and outputs the result of the operation (image recognition result).

Specifically, the image recognition processor 12 at least includes a controller 121, an ALU (arithmetic operation unit) 122, and a ternary multiplier (ternary multiplication unit) 123. Further, the controller 121 includes a register unit 124 including a plurality of registers.

The controller 121 decodes the instruction data received from the memory 13 and controls the ALU 122 and the ternary multiplier 123. The ALU 122 is a circuit having functions such as multiplication, addition, logical operation, bit count and the like. The ternary multiplier 123 is a circuit that multiplies the plurality of pieces of 2-bit wide ternary data (elements) stored in the register of the address that is designated by the plurality of respective pieces of 2-bit wide ternary data (elements) stored in another address that is designated. The operation result in each of the ALU 122 and the ternary multiplier 123 is written in the register unit 124.

(Configuration Example of Ternary Multiplier 123)

Figure 7:
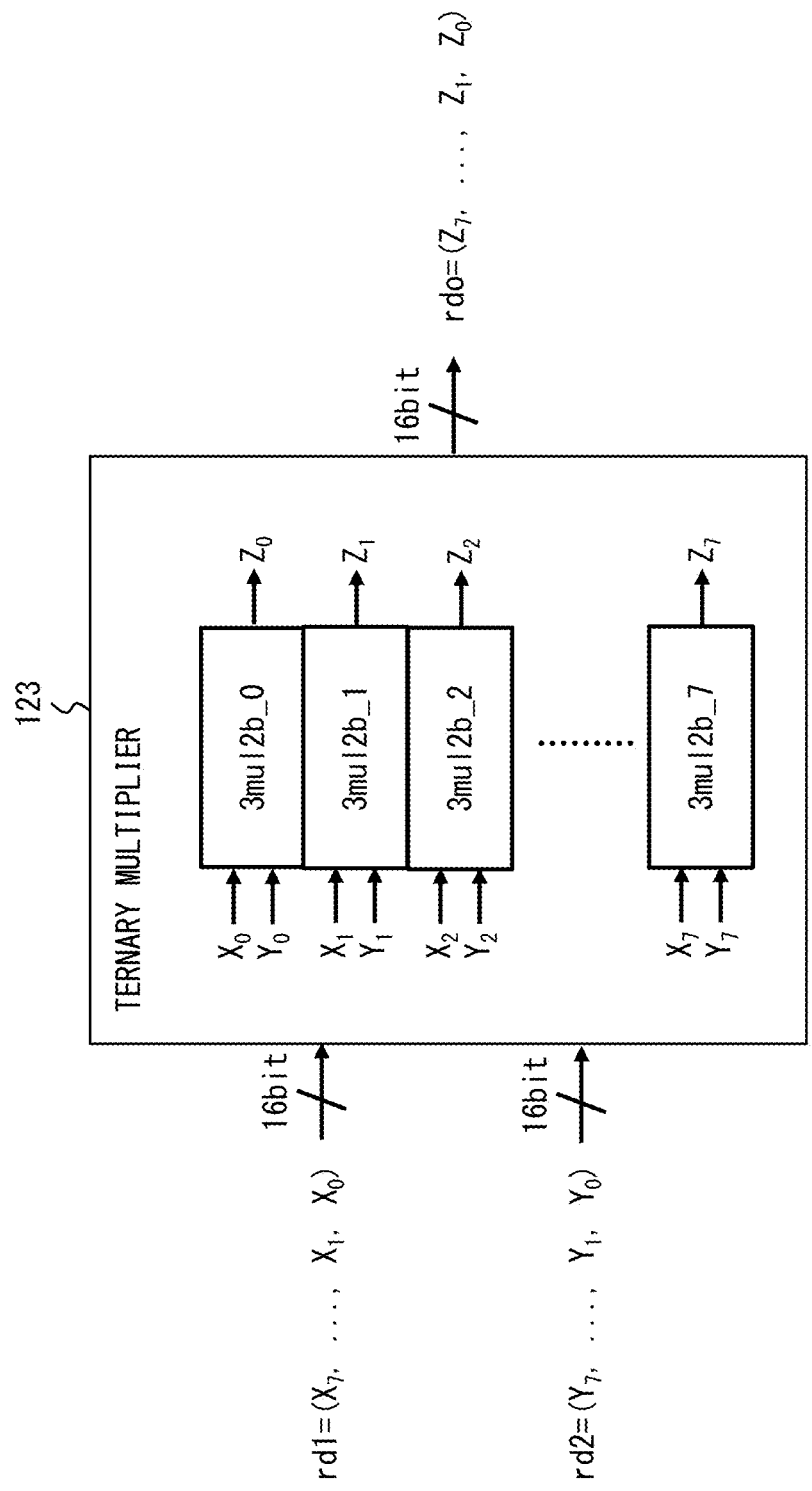
FIG. 7 is a block diagram showing a ternary multiplier provided in the image recognition processor shown in FIG. 6.

FIG. 7 is a block diagram showing the ternary multiplier 123. In this example, a case in which the number of elements N is 8 and the word length L is 16 will be described.

As shown in FIG. 7, the ternary multiplier 123 receives 16-bit wide data rd1 including eight pieces of 2-bit wide ternary data (elements) $X_0$ to $X_7$ and 16-bit wide data rd2 including eight pieces of 2-bit wide ternary data (elements) $Y_0$ to $Y_7$ to output 16-bit wide data rdo including eight pieces of 2-bit wide ternary data (elements) $Z_0$ to $Z_7$.

More specifically, the ternary multiplier 123 includes L/2 ternary multiplication circuits. Since L is 16, the ternary multiplier 123 includes eight ternary multiplication circuits 3mul2*b*_0 to 3mul2*b*_7. The ternary multiplication circuits 3mul2*b*_0 to 3mul2*b*_7 respectively multiply the 2-bit wide ternary data $X_0$ to $X_7$ forming the data rd1 by the 2-bit wide ternary data $Y_0$ to $Y_7$ forming the data rd2 to output the 2-bit wide ternary data $Z_0$ to $Z_7$ forming the data rdo.

Figure 8:
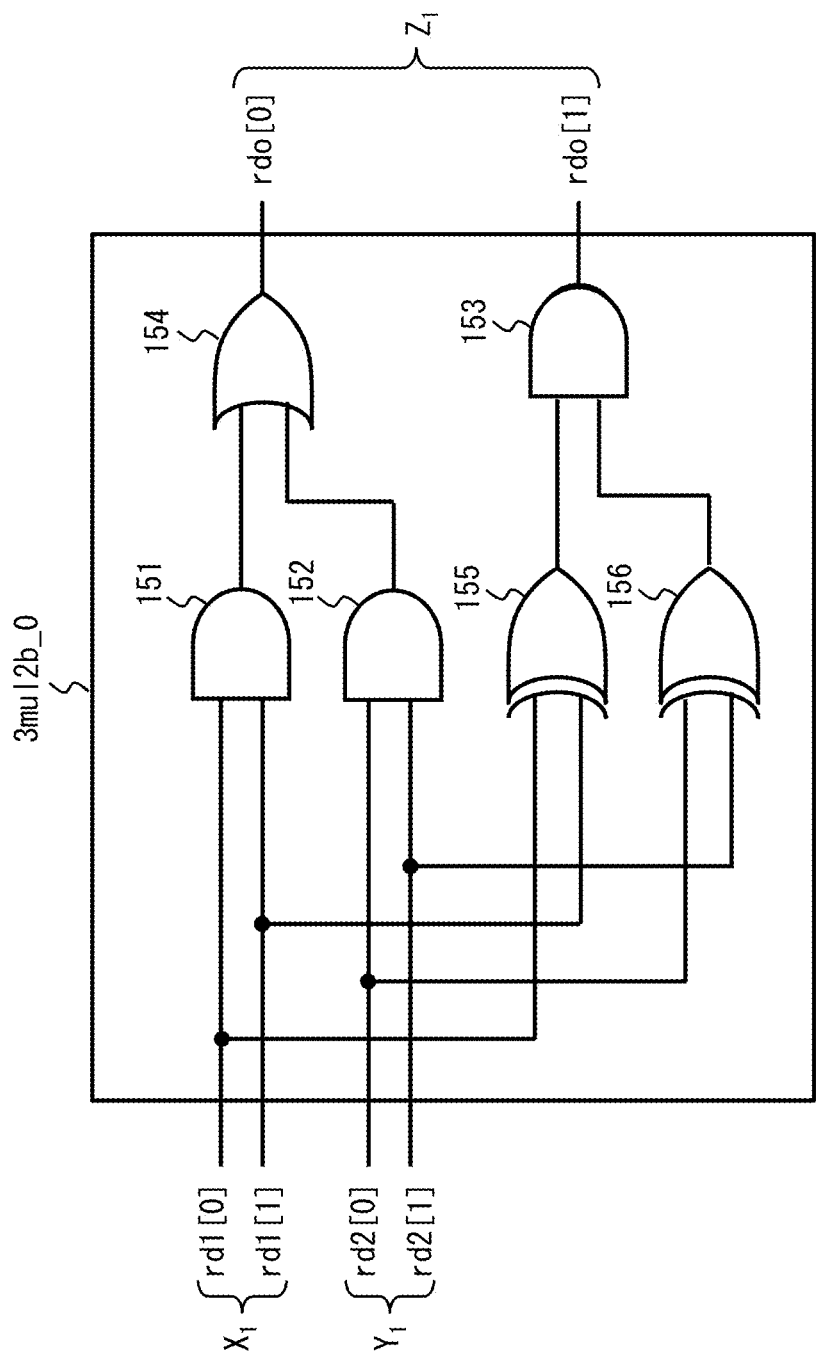
FIG. 8 is a circuit diagram showing a specific example of the ternary multiplier provided in the image recognition processor shown in FIG. 6.

FIG. 8 is a circuit diagram showing a specific example of the ternary multiplication circuit 3mul2*b*_0. Since the ternary multiplication circuits 3mul2*b*_1 to 3mul2*b*_7 have the configuration same as that of the ternary multiplication circuit 3mul2*b*_0, the description thereof will be omitted.

As shown in FIG. 8, the ternary multiplication circuit 3mul2*b*_0 multiplies the ternary data $X_0$ included in the data rd1 by the ternary data $Y_0$ included in the data rd2 to output the ternary data $Z_0$ included in the data rdo. The ternary data $X_0$ is formed of the 0-th bit (rd1[0]) and the first bit (rd1[1]) of the data rd1. The ternary data $Y_0$ is formed of the 0-th bit (rd2[0]) and the first bit (rd2[1]) of the data rd2. The ternary data $Z_0$ is formed of the 0-th bit (rdo[0]) and the first bit (rdo[1]) of the data rdo.

Specifically, the ternary multiplication circuit 3mul2*b*_0 includes logical AND circuits (hereinafter referred to as AND circuits) 151 to 153, a logical OR circuit (hereinafter referred to as an OR circuit) 154, and exclusive OR circuits (hereinafter referred to as EXOR circuits) 155 and 156.

The AND circuit 151 outputs a logical AND of the data rd1[0] and the data rd1[1]. The AND circuit 152 outputs a logical AND of the data rd2[0] and the data rd2[1]. The OR circuit 154 outputs a logical OR of the outputs of the AND circuits 151 and 152 as the data rdo[0].

The EXOR circuit 155 outputs an exclusive OR of the data rd1[0] and the data rd1[1]. The EXOR circuit 156 outputs an exclusive OR of the data rd2[0] and the data rd2[1]. The AND circuit 153 outputs a logical AND of the outputs of the EXOR circuits 155 and 156 as the data rdo[1].

According to the above configuration, the ternary multiplication circuit 3mul2*b*_0 is able to output the result of the multiplication in which the ternary data +1, 0, and −1 are respectively expressed by the 2-bit wide binary values "01", "00", and "10".

The configuration of the ternary multiplication circuits 3mul2*b*_0 to 3mul2*b*_7 is not limited to the above configuration and may be appropriately changed to another configuration having the similar functions.

(Operation of Image Recognition Processor 12)

Next, with reference to FIGS. 9 and 10, an operation of the image recognition processor 12 will be described.

FIG. 9 is an assembly program regarding ternary inner product arithmetic processing.

The controller 121 controls processing of the ALU 122 and the ternary multiplier 123 based on the assembly program shown in FIG. 9, which is one of instruction codes stored in the memory 13. In this example, a case in which the number of elements N is 128 and the word length L is 16 will be described. Accordingly, eight pieces of 2-bit wide ternary data can be stored in each word. It is assumed that each register provided in the register unit 124 is able to store data of one word (that is, 16 bits).

As shown in FIG. 9, in the first cycle, in response to a load instruction, eight elements of 128 elements forming one input data (e.g., the feature amount data) are read out from the memory 13 and stored in the register unit 124. Specifically, eight pieces of 2-bit wide ternary data (e.g., elements of the feature amount data) stored in the address of the memory 13 specified by adding an address offset stored in a register r2 to the leading address of the memory 13 stored in a register r1 is stored in a register of a register address r0 (referred to as a register r0).

In the second cycle, in response to a load instruction, eight elements of 128 elements forming the other input data (e.g., the dictionary data) are read out from the memory 13 and stored in the register unit 124. Specifically, eight pieces of 2-bit wide ternary data (e.g., elements of the dictionary data) stored in the address of the memory 13 specified by adding the address offset stored in the register r2 to the leading address of the memory 13 stored in a register r4 is stored in a register of a register address r3 (called a register r3).

In the third cycle, in response to a dedicated ternary multiplication instruction (mult3), multiplication by the ternary multiplier 123 is carried out. The ternary multiplier 123 multiples the eight elements of one input data by the respective eight elements of the other input data. Specifically, the ternary multiplier 123 multiplies the eight pieces of 2-bit wide ternary data stored in the register r0 by the respective eight pieces of 2-bit wide ternary data stored in the register r3 in parallel. The result of the multiplication (eight pieces of 2-bit wide ternary data) of the ternary multiplier 123 is stored in a register r5.

In the fourth cycle, a logical AND of the result of the multiplication in the ternary multiplier 123 stored in the register r5 (eight pieces of 2-bit wide ternary data) and 0b0101010101010101 (=0x5555) is executed, and the result of the logical AND is stored in a register r6. This logical operation corresponds to bit mask processing that directly outputs the value of the lower bit (even-number bit) of each ternary data to mask the value of the higher bit (odd-number bit) to 0. Since the binary digit of +1 is expressed as "01", the binary digit of 0 is expressed as "00", and the binary digit of −1 is expressed as "10", only the ternary data indicating +1 is stored in the register r6.

In the fifth cycle, a logical AND of the result of the multiplication in the ternary multiplier 123 stored in the register r5 (eight pieces of 2-bit wide ternary data) and 0b1010101010101010 (=0xAAAA) is executed, and the result of the logical AND operation is stored in a register r7. This logical operation corresponds to bit mask processing that directly outputs the value of the higher bit (odd-number bit) of each ternary data to mask the value of the lower bit (even-number bit) to 0. Since the binary digit of +1 is expressed as "01", the binary digit of 0 is expressed as "00", and the binary digit of −1 is expressed as "10", only the ternary data indicating −1 is stored in the register r7.

In the sixth cycle, in response to a bit count instruction, the number of pieces of ternary data indicating +1 stored in the register r6 is counted. Specifically, the number of bits indicating 1 of 16 bits forming the data stored in the register r6 is counted. The result of the count is stored in a register r8.

In the seventh cycle, in response to a bit count instruction, the number of pieces of ternary data indicating −1 stored in the register r7 is counted. Specifically, the number of bits indicating 1 of 16 bits forming the data stored in the register r7 is counted. The result of the count is stored in a register r9.

In the eighth cycle, the number of pieces of ternary data indicating −1 stored in the register r9 is subtracted from the number of pieces of ternary data indicating +1 stored in the register r8. This result of subtraction corresponds to the inner product operation result of eight elements and is stored in a register r10.

FIG. 10 is a diagram showing a specific example of the ternary inner product arithmetic processing.

Referring to FIG. 10, in the first cycle, (+1, +1, 0, 0, 0, −1, −1, −1)=(01, 01, 00, 00, 00, 10, 10, 10) is stored in the register r0, and in the second cycle, (−1, +1, −1, 0, +1, −1, 0, +1)=(10, 01, 10, 00, 01, 10, 00, 01) is stored in the register r3.

In this case, the result of the multiplication in the ternary multiplier 123 in the third cycle is (−1, +1, 0, 0, 0, +1, 0, −1)=(10, 01, 00, 00, 00, 01, 00, 10).

Accordingly, the result of the bit mask processing in the fourth cycle is (00, 01, 00, 00, 00, 01, 00, 00).

Further, the result of the bit mask processing in the fifth cycle is (10, 00, 00, 00, 00, 00, 00, 10).

Accordingly, as the result of the bit count in the sixth cycle, the number of pieces of ternary data indicating +1 is two. As the result of the bit count in the seventh cycle, the number of pieces of ternary data indicating −1 is two.

Accordingly, the result of the subtraction in the eighth cycle, that is, the inner product operation result of the eight elements, is "the number of pieces of ternary data indicating +1"−"the number of pieces of ternary data indicating −1"=2−2=0.

Referring back to FIG. 9, in the ninth cycle, the inner product operation result of eight elements stored in the register r10 is accumulatively added to the value of a register r11 (initial value is 0).

In the tenth cycle, 1 is added to the offset value stored in the register r2. It is therefore possible to read out the next eight elements.

In the eleventh cycle, it is determined whether the offset value stored in the register r2 has reached a predetermined value. That is, it is determined whether the inner product has been performed on all the 128 elements forming each input data. When the inner product has not been performed on at least one of the 128 elements, the process goes back to the first cycle. On the other hand, when the inner product has been performed on all the 128 elements, the process goes to the next processing. Since the number of elements is 128, the word length L is 16, and eight elements are stored in one word in this example, processing of the first to eleventh cycles is repeated 16(=128/8)) times in total. The inner product operation result of the 128 elements is eventually stored in the register r11.

Since processing of the first to eleventh cycles is repeated 16 times, the total number of cycles is 11×16=176 cycles.

(Configuration of Related Art)

Figures 21, 22:
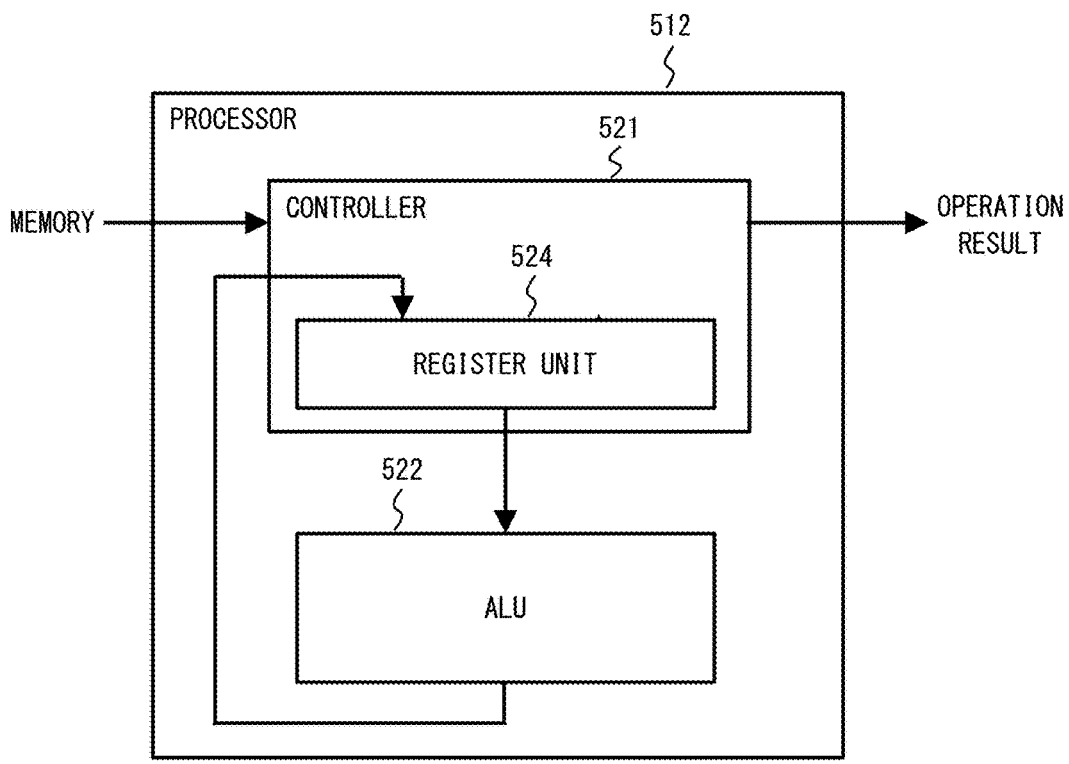
FIG. 21 is a block diagram showing an image recognition processor according to the related art.
FIG. 22 is an assembly program regarding ternary inner product arithmetic processing according to the related art.

FIG. 21 is a block diagram showing a configuration of an image recognition processor 52 according to a related art.

As shown in FIG. 21, the image recognition processor 52 includes a controller 521 and an ALU 522. Further, the controller 521 includes a register unit 524 including a plurality of registers.

The controller 521 decodes instruction data received from an external memory to control the ALU 522. The result of the operation in the ALU 522 is written into the register unit 524.

(Operation of Related Art)

Next, an operation of the image recognition processor 52 according to the related art will be described. FIG. 22 is an assembly program regarding ternary inner product arithmetic processing according to the related art. In this example, a case in which the number of elements N is 128 and the word length L is 16 will be described. In the configuration according to the related art, only one piece of ternary data is stored for each word as described above.

As shown in FIG. 22, in the first cycle, in response to a load instruction, one of 128 elements forming one input data (e.g., the feature amount data) is read out from an external memory and stored in the register unit 524. Specifically, one 16-bit wide ternary data (e.g., elements of the feature amount data) stored in the address of the external memory specified by adding an address offset stored in a register r2 to the leading address of the external memory stored in a register r1 is stored in a register r0.

In the second cycle, in response to a load instruction, one of 128 elements forming the other input data (e.g., the dictionary data) is read out from the external memory and stored in the register unit 524. Specifically, one 16-bit wide ternary data (e.g., elements of the dictionary data) stored in the address of the external memory specified by adding the address offset stored in the register r2 to the leading address of the external memory stored in a register r4 is stored in a register r3.

In the third cycle, one element of one input data is multiplied by one element of the other input data. Specifically, one piece of ternary data stored in the register r0 is multiplied by one piece of ternary data stored in the register r3. This result of the multiplication (one 16-bit wide ternary data) corresponds to the inner product operation result of one element and is stored in a register r5.

In the fourth cycle, the inner product operation result of one element stored in the register r5 is accumulatively added to the value of a register r6 (initial value is 0).

In the fifth cycle, 1 is added to the offset value stored in the register r2. It is therefore possible to read out the next one element.

In the sixth cycle, it is determined whether the offset value stored in the register r2 has reached a predetermined value. That is, it is determined whether the inner product has been performed on all the 128 elements forming each input data. When the inner product has not been performed on at least one of the 128 elements, the cycle goes back to the first cycle. When the inner product has been performed on all the 128 elements, the process goes to the next processing. Since the number of elements is 128, the word length L is 16, and only one element is stored in one word in this example, processing of the first to sixth cycles is repeated 128 times in total. The inner product operation result of the 128 elements is eventually stored in the register r6.

Since the processing from the first to sixth cycles is repeated 128 times, the total number of cycles is 6×128=768 cycles.

As described above, the image recognition processor 12 is able to execute the ternary inner product operation of two pieces of input data more efficiently with the smaller number of cycles compared to the image recognition processor 52 according to the related art.

(Hardware Configuration of Image Recognition Processor and Image Recognition Device)

The image recognition processor 12 and the image recognition device 1 including the image recognition processor 12 may be achieved, for example, by a general computer system. Hereinafter, with reference to FIG. 11, this point will be briefly described.

Figure 11:
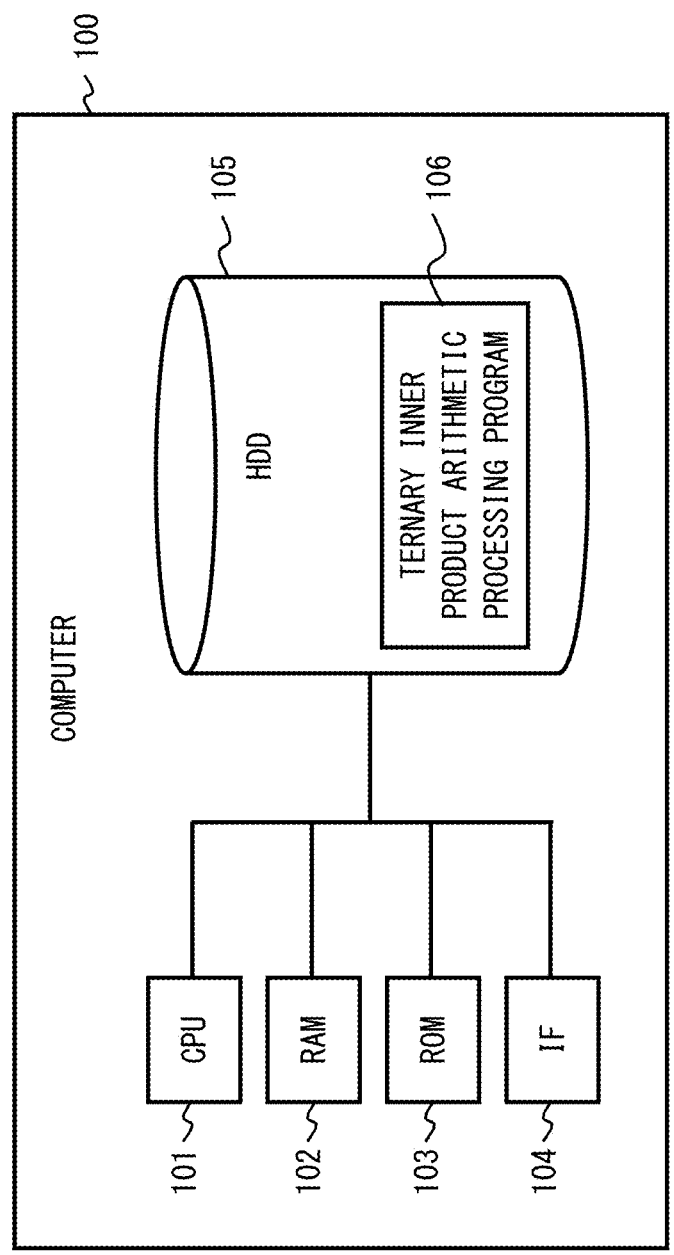
FIG. 11 is a block diagram showing one example of hardware configurations of the image recognition device shown in FIG. 1 and the image recognition processor provided in the image recognition device.

FIG. 11 is a block diagram showing one example of hardware configurations of the image recognition processor 12 and the image recognition device 1 including the image recognition processor 12. A computer 100 includes, for example, a Central Processing Unit (CPU; corresponding to the image recognition processor 12 and the host processor 11) 101 which is a control apparatus, a Random Access Memory (RAM) 102, a Read Only Memory (ROM) 103, an Inter Face (IF) 104 which is an interface with an external device, and a Hard Disk Drive (HDD) 105 which is one example of a non-transitory storage device. Further, the computer 100 may also include, although not shown in FIG. 11, input devices such as a key board and a mouse and a display device such as a display.

The HDD 105 stores an Operating System (OS) (not shown) and a ternary inner product arithmetic processing program 106. The ternary inner product arithmetic processing program 106 is a computer program in which the ternary inner product arithmetic processing according to this embodiment is implemented.

The CPU 101 controls various processing in the computer 100, accesses or the like to the RAM 102, the ROM 103, the IF 104, and the HDD 105. In the computer 100, the CPU 101 reads and executes the OS and the ternary inner product arithmetic processing program 106 stored in the HDD 105. The computer 100 therefore implements the image recognition processor 12 and the image recognition device including the image recognition processor 12 according to this embodiment.

(Other Applications of Image Recognition Device 1)

Next, other applications of the image recognition device 1 will be described.

Figure 12:
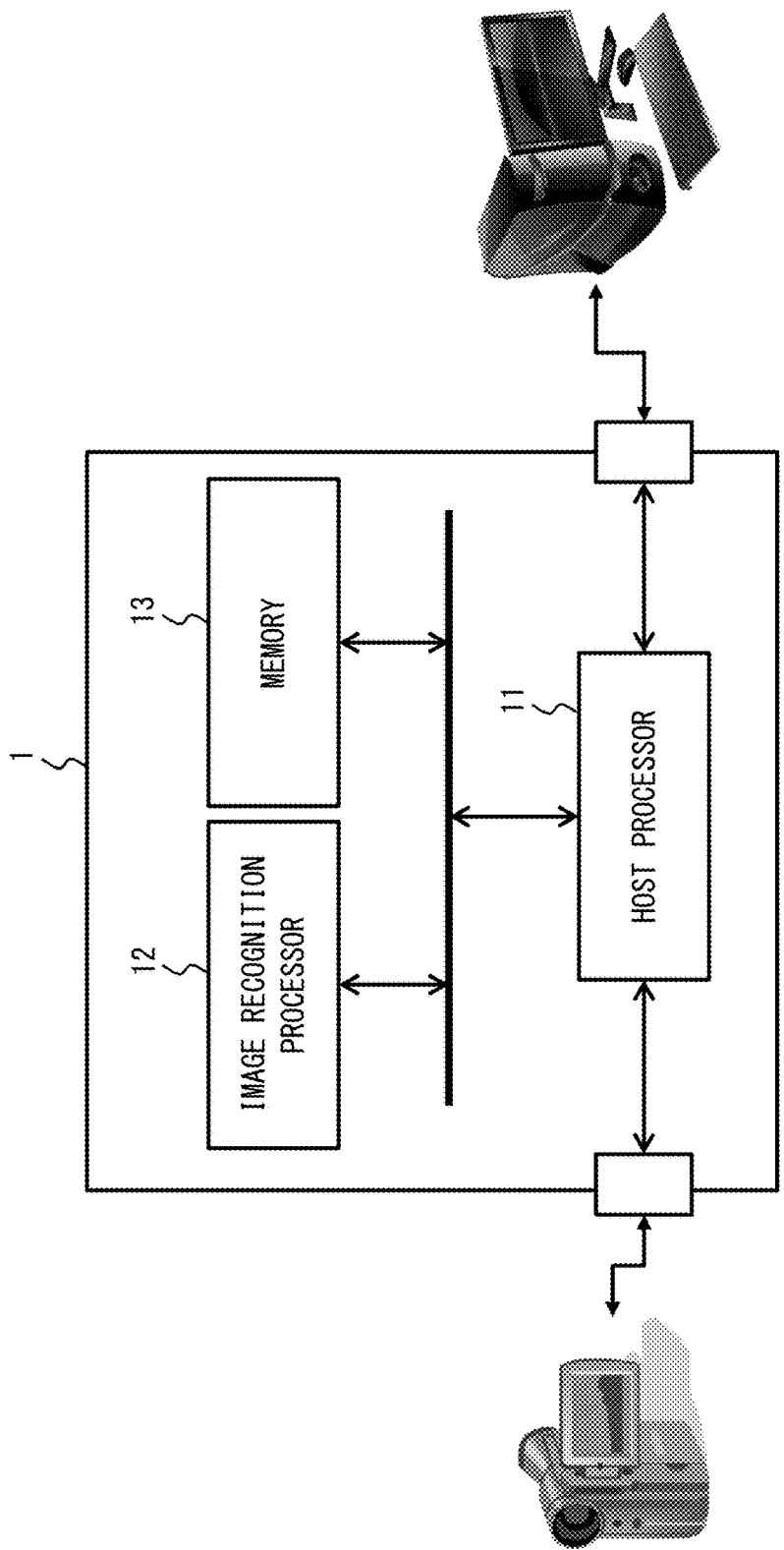
FIG. 12 is a diagram showing an another example to which the image recognition device shown in FIG. 1 is applied.

FIG. 12 is a diagram showing an example to which the image recognition device 1 is applied.

As shown in FIG. 12, the image recognition device 1 is not limited to being applied to the case in which it is installed in a vehicle and may also be applied to a case in which an image captured by a video or the like is taken into a personal computer.

Second Embodiment

Figure 13:
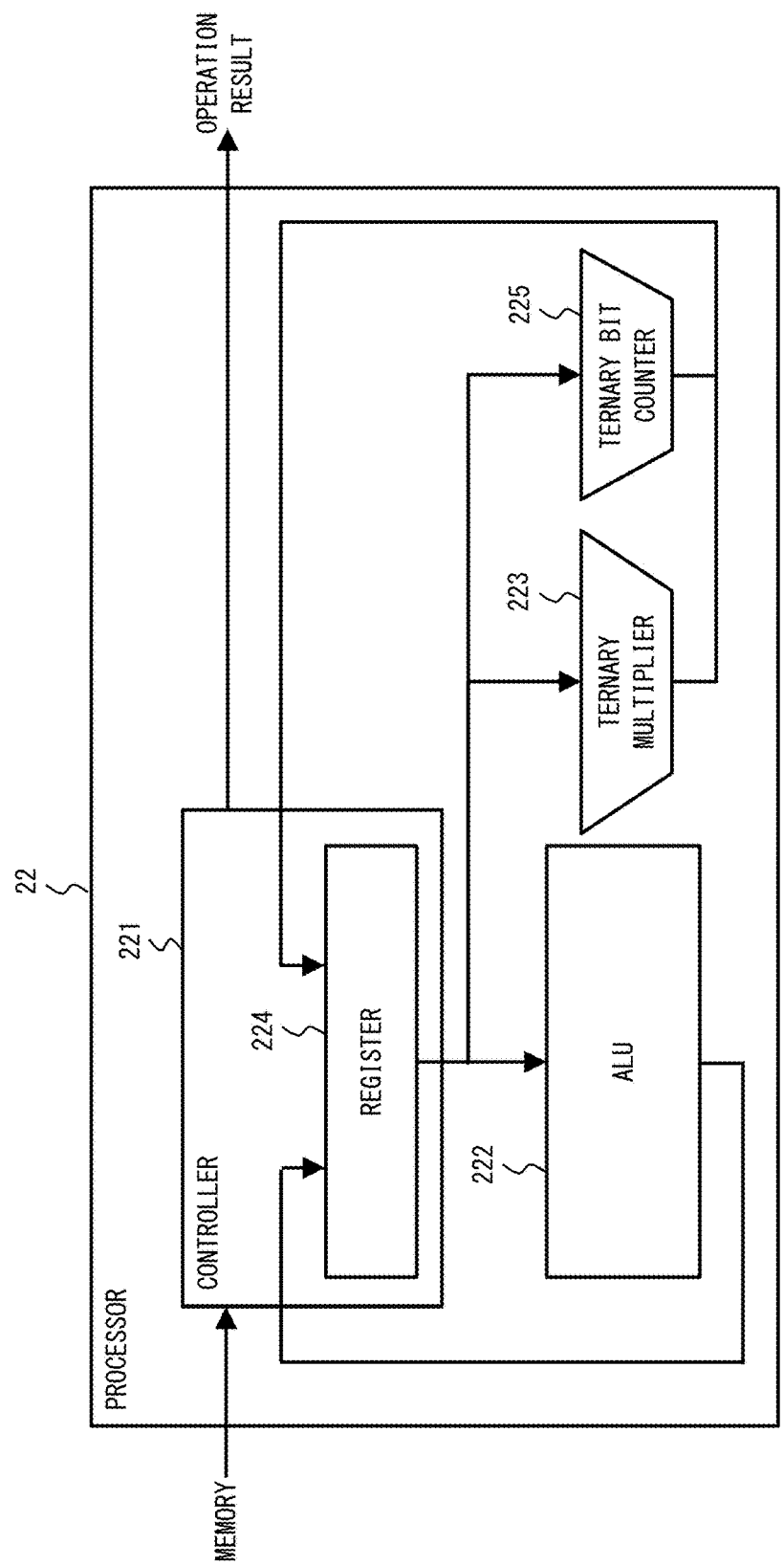
FIG. 13 is a block diagram showing an image recognition processor according to a second embodiment.

FIG. 13 is a block diagram showing an image recognition processor 22 according to a second embodiment.

As shown in FIG. 13, the image recognition processor 22 at least includes a controller 221, an ALU 222, a ternary multiplier 223, and a ternary bit counter 225. Further, the controller 221 includes a register unit 224 including a plurality of registers. The controller 221, the ALU 222, the ternary multiplier 223, and the register unit 224 correspond to the controller 121, the ALU 122, the ternary multiplier 123, and the register unit 124, respectively.

The controller 211 decodes instruction data received from the memory 13 to control the ALU 222, the ternary multiplier 223, and the ternary bit counter 225. The ternary bit counter 225 is a circuit that selectively counts the number of pieces of ternary data indicating +1 and the number of pieces of ternary data indicating −1 of the plurality of pieces of 2-bit wide ternary data (elements) stored in the register of the address that is designated. Since the ALU 222 and the ternary multiplier 223 are similar to the ALU 122 and the ternary multiplier 123, the descriptions thereof will be omitted. The operation result in each of the ALU 222, the ternary multiplier 223, and the ternary bit counter 225 is written into the register unit 224.

(Ternary Bit Counter 225)

Figure 14:
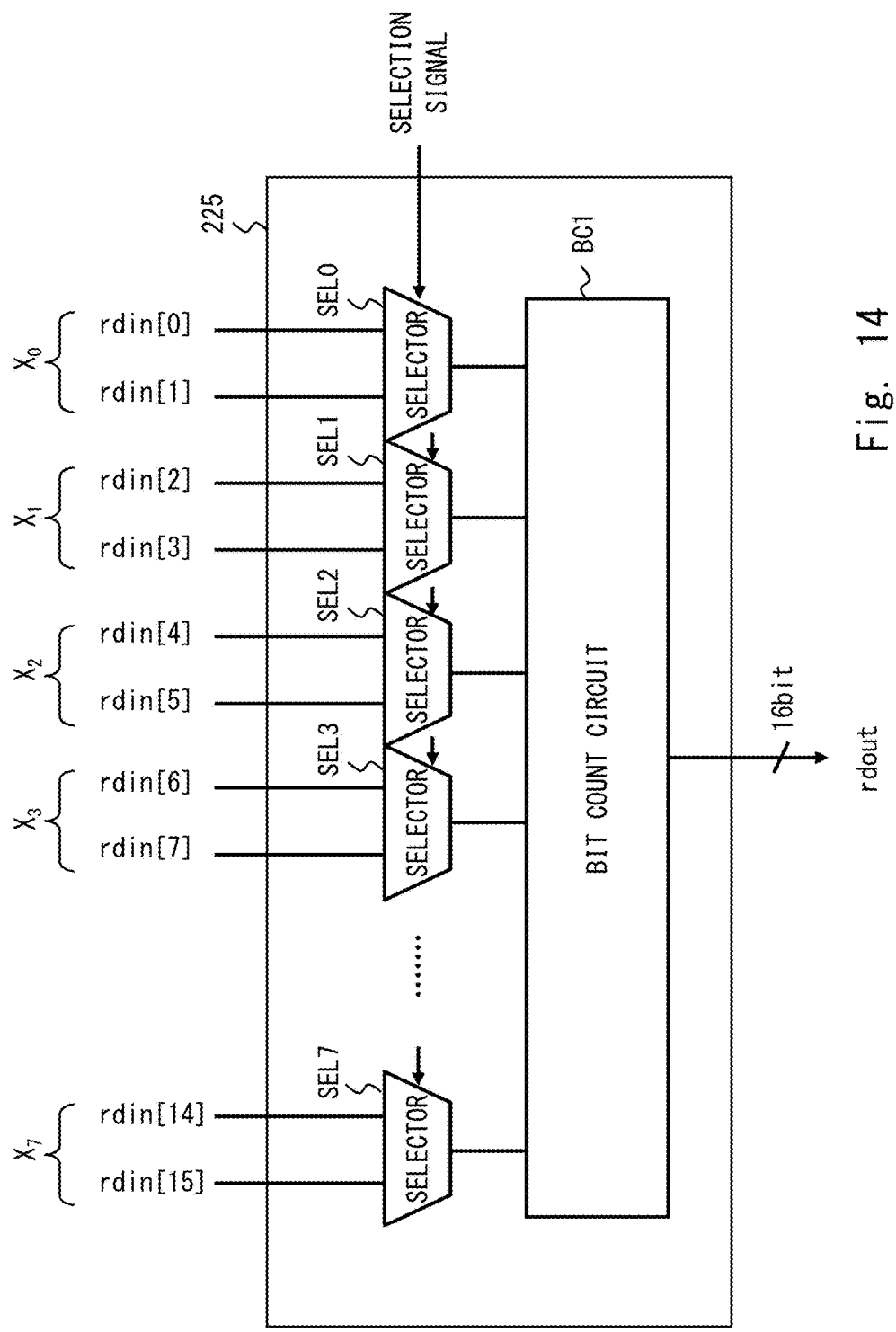
FIG. 14 is a block diagram showing a ternary bit counter provided in the image recognition processor shown in FIG. 13.

FIG. 14 is a block diagram showing the ternary bit counter 225. In this example, a case in which the number of elements N is 8 and the word length L is 16 will be described.

As shown in FIG. 14, the ternary bit counter 225 receives 16-bit wide data rdin including eight pieces of 2-bit wide ternary data (elements) $X_0$ to $X_7$, selectively counts the number of pieces of ternary data indicating +1 and the number of pieces of ternary data indicating −1, and outputs the result of the count as data rdout.

More specifically, the ternary bit counter 225 includes L/2 selectors and a bit count circuit BC1. Since L is 16, the ternary bit counter 225 includes eight selectors SEL0 to SEL7. The selectors SEL0 to SEL7 respectively select and output lower bits (even-number bits) of the ternary data $X_0$ to $X_7$ or higher bits (odd-number bits) of the ternary data $X_0$ to $X_7$. Since the binary digit of +1 is expressed as "01", the binary digit of 0 is expressed as "00", and the binary digit of −1 is expressed as "10", it can be determined whether the ternary data $X_0$ to $X_7$ indicate +1 based on the values of the lower bits (even-number bits) of the ternary data $X_0$ to $X_7$, and it can be determined whether the ternary data $X_0$ to $X_7$ indicate −1 based on the values of the higher bits (odd-number bits) of the ternary data $X_0$ to $X_7$.

The bit count circuit BC1 counts the number of output results indicating 1 of the results output from the selectors SEL0 to SEL7. Specifically, when the lower bits of the ternary data $X_0$ to $X_7$ are selected by the selectors SEL0 to SEL7, the bit count circuit BC1 counts the number of pieces of ternary data $X_0$ to $X_7$ indicating +1. On the other hand, when the higher bits of the ternary data $X_0$ to $X_7$ are selected by the selectors SEL0 to SEL7, the bit count circuit BC1 counts the number of pieces of ternary data $X_0$ to $X_7$ indicating −1. The bit count circuit BC1 outputs the result of the count as data rdout.

According to the above configuration, the ternary bit counter 225 is able to selectively count the number of pieces of ternary data indicating +1 and the number of pieces of ternary data indicating −1 of the eight pieces of ternary data. The configuration of the ternary bit counter 225 is not limited to the above configuration and may be appropriately changed to another configuration having the similar functions.

(Operation of Image Recognition Processor 22)

Next, with reference to FIG. 15, an operation of the image recognition processor 22 will be described.

FIG. 15 is an assembly program regarding the ternary inner product arithmetic processing.

The controller 221 controls processing of the ALU 222, the ternary multiplier 223, and the ternary bit counter 225 based on the assembly program shown in FIG. 15, which is one of the instruction codes stored in the memory 13. In this example, a case in which the number of elements N is 128 and the word length L is 16 will be described. Therefore, it is possible to store eight pieces of 2-bit wide ternary data in each word. It is assumed that each register provided in the register unit 224 is able to store data of one word (that is, 16 bits).

As shown in FIG. 15, in the first cycle, eight pieces of 2-bit wide ternary data (e.g., elements of the feature amount data) are stored in the register r0. In the second cycle, eight pieces of 2-bit wide ternary data (e.g., elements of the dictionary data) are stored in the register r3.

In the third cycle, in response to a dedicated ternary multiplication instruction (mult3), multiplication by the ternary multiplier 223 is carried out. Specifically, the ternary multiplier 223 multiplies the eight pieces of 2-bit wide ternary data stored in the register r0 by the respective eight pieces of 2-bit wide ternary data stored in the register r3 in parallel. The result of the multiplication (eight pieces of 2-bit wide ternary data) of the ternary multiplier 223 is stored in the register r5.

In the fourth cycle, in response to a dedicated bit count instruction (bcountE), the number of pieces of ternary data indicating +1 is counted by the ternary bit counter 225. Specifically, the ternary bit counter 225 counts the number of even-number bits indicating 1 of the result of the multiplication in the ternary multiplier 223 stored in the register r5. This result of the count is stored in the register r6.

In the fifth cycle, in response to a dedicated bit count instruction (bcountO), the number of pieces of ternary data indicating −1 is counted by the ternary bit counter 225. Specifically, the ternary bit counter 225 counts the number of odd-number bits indicating 1 of the result of the multiplication in the ternary multiplier 223 stored in the register r5. This result of the count is stored in the register r7.

In the sixth cycle, the number of pieces of ternary data indicating −1 stored in the register r7 is subtracted from the number of pieces of ternary data indicating +1 stored in the register r6. This result of subtraction corresponds to the inner product operation result of eight elements and is stored in the register r8.

In the seventh cycle, the inner product operation result of eight elements stored in the register r8 is accumulatively added to the value of the register r9 (initial value is 0).

In the eighth cycle, 1 is added to the offset value stored in the register r2. It is therefore possible to read out the next eight elements.

In the ninth cycle, it is determined whether the offset value stored in the register r2 has reached a predetermined value. That is, it is determined whether the inner product has been performed on all the 128 elements forming each input data. When the inner product has not been performed on at least one of the 128 elements, the process goes back to the first cycle. On the other hand, when the inner product has been performed on all the 128 elements, the process goes to the next processing. Since the number of elements is 128, the word length L is 16, and eight elements are stored in one word in this example, processing of the first to ninth cycles is repeated 16 (=128/8)) times in total. The inner product operation result for the 128 elements is eventually stored in the register r9.

Since the processing of the first to ninth cycles is repeated 16 times, the total number of cycles is 9×16=144 cycles.

As described above, the image recognition processor 22 is able to efficiently execute the ternary inner product operation of two pieces of input data with the smaller number of cycles compared to the image recognition processor 12 does.

Third Embodiment

Figure 16:
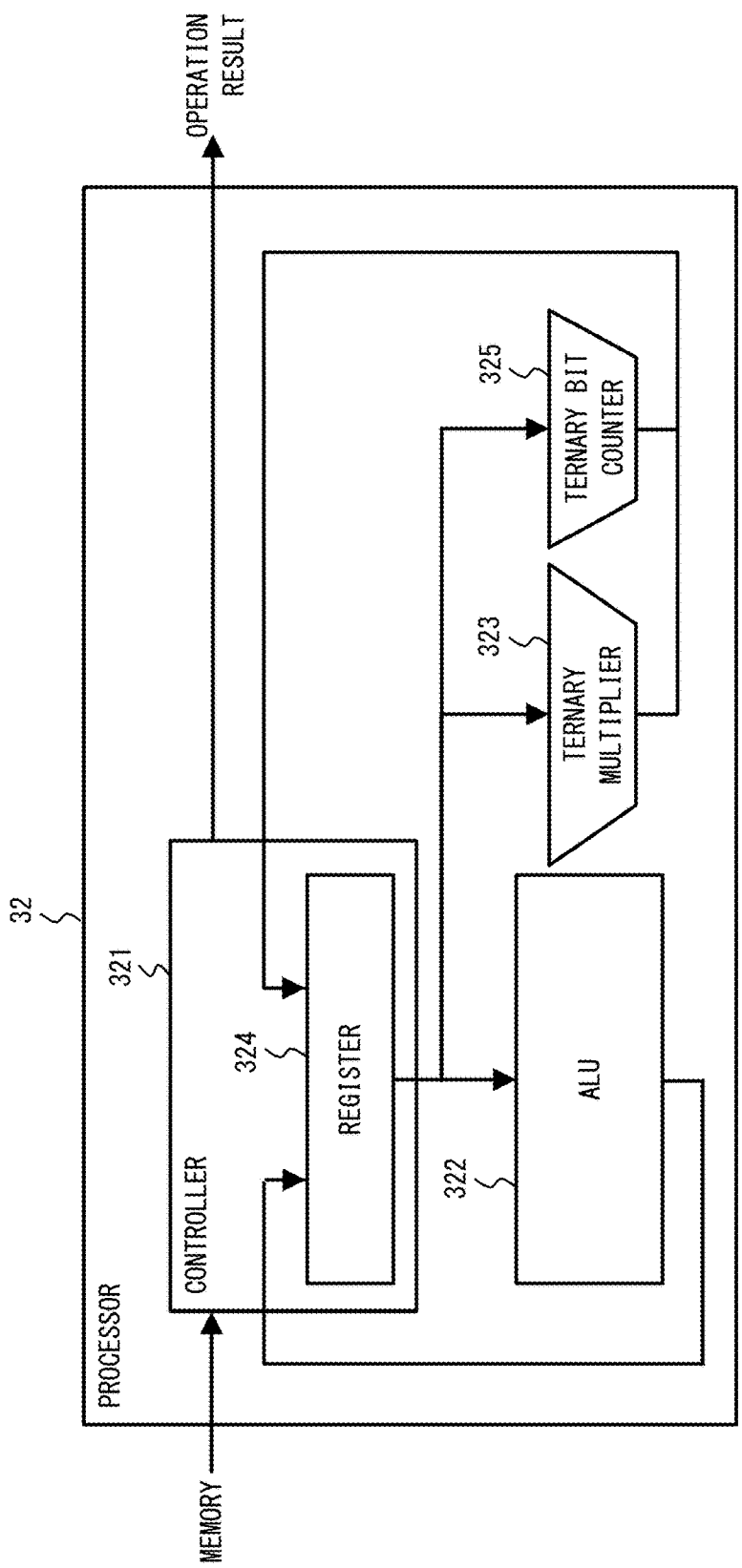
FIG. 16 is a block diagram showing an image recognition processor according to a third embodiment.

FIG. 16 is a block diagram showing an image recognition processor 32 according to a third embodiment.

As shown in FIG. 16, the image recognition processor 32 at least includes a controller 321, an ALU 322, a ternary multiplier 323, and a ternary bit counter (multiplication result processing unit) 325. Further, the controller 321 includes a register unit 324 including a plurality of registers. The controller 321, the ALU 322, the ternary multiplier 323, and the register unit 324 correspond to the controller 121, the ALU 122, the ternary multiplier 123, and the register unit 124, respectively.

The controller 311 decodes instruction data received from the memory 13 to control the ALU 322, the ternary multiplier 323, and the ternary bit counter 325. The ternary bit counter 325 counts each of the number of pieces of ternary data indicating +1 and the number of pieces of ternary data indicating −1 of the plurality of pieces of 2-bit wide ternary data (elements) stored in the register of the address that is designated to output the result obtained by subtracting the number of pieces of ternary data indicating −1 from the number of pieces of ternary data indicating +1. Since the ALU 322 and the ternary multiplier 323 are respectively similar to the ALU 122 and the ternary multiplier 123, the descriptions thereof will be omitted. The results of the operations in the ALU 322, the ternary multiplier 323, and the ternary bit counter 325 are written in the register unit 324.

(Ternary Bit Counter 325)

Figure 17:
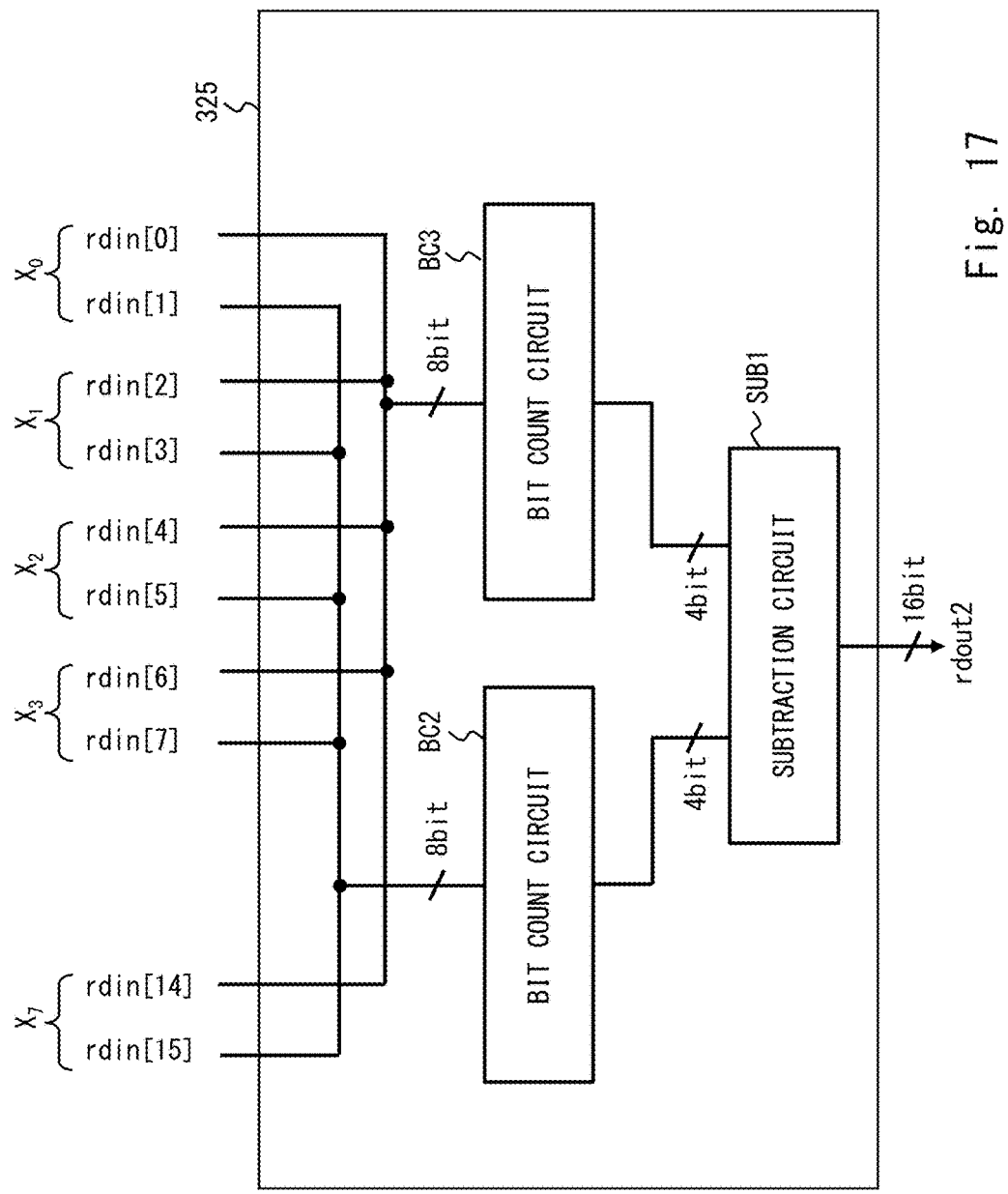
FIG. 17 is a block diagram showing a ternary bit counter provided in the image recognition processor shown in FIG. 16.

FIG. 17 is a block diagram showing the ternary bit counter 325. A case in which the number of elements N is 8 and the word length L is 16 will be described here.

As shown in FIG. 17, the ternary bit counter 325 receives 16-bit wide data rdin including eight pieces of 2-bit wide ternary data (elements) $X_0$ to $X_7$, counts each of the number of pieces of ternary data indicating +1 and the number of pieces of ternary data indicating −1, calculates the difference between the number of pieces of ternary data indicating +1 and the number of pieces of ternary data indicating −1, and outputs the difference as data rdout2.

More specifically, the ternary bit counter 325 includes bit count circuits (first and second counters) BC2 and BC3 and a subtraction circuit SUB1. The bit count circuit BC2 counts the number of bits indicating 1 of the higher bits (odd-number bits) of the ternary data $X_0$ to $X_7$. The bit count circuit BC3 counts the number of bits indicating 1 of the lower bits (even-number bits) of the ternary data $X_0$ to $X_7$.

Since the binary digit of +1 is expressed by "01", the binary digit of 0 is expressed by "00", and the binary digit of −1 is expressed by "10", the number of pieces of ternary data $X_0$ to $X_7$ indicating −1 can be specified based on the number of bits indicating 1 of the higher bits (odd-number bits) of the ternary data $X_0$ to $X_7$, and the number of pieces of ternary data $X_0$ to $X_7$ indicating +1 can be specified based on the number of bits indicating 1 of the lower bits (even-number bits) of the ternary data $X_0$ to $X_7$.

The subtraction circuit SUB1 subtracts the number of pieces of ternary data indicating −1 from the number of pieces of ternary data indicating +1 to output the result of subtraction as data rdout2. This result of subtraction corresponds to the inner product operation result of the eight elements.

According to the above configuration, the ternary bit counter 325 is able to count each of the number of pieces of ternary data indicating +1 and the number of pieces of ternary data indicating −1 of eight pieces of ternary data to output the difference between the number of pieces of ternary data indicating +1 and the number of pieces of ternary data indicating −1 as the inner product operation result of the eight elements. The configuration of the ternary bit counter 325 is not limited to the above configuration and may be appropriately changed to another configuration having the similar functions.

(Operation of Image Recognition Processor 32)

Next, with reference to FIG. 18, an operation of the image recognition processor 32 will be described.

FIG. 18 is an assembly program regarding the ternary inner product arithmetic processing.

The controller 321 controls processing of the ALU 322, the ternary multiplier 323, and the ternary bit counter 325 based on the assembly program shown in FIG. 18, which is one of the instruction codes stored in the memory 13. In this example, a case in which the number of elements N is 128 and the word length L is 16 will be described. Therefore, eight pieces of 2-bit wide ternary data can be stored in one word. It is assumed that each register provided in the register unit 324 is able to store data of one word (that is, 16 bits).

As shown in FIG. 18, in the first cycle, eight pieces of 2-bit wide ternary data (e.g., elements of the feature amount data) is stored in the register r0. In the second cycle, eight pieces of 2-bit wide ternary data (e.g., elements of the dictionary data) are stored in the register r3.

In the third cycle, in response to a dedicated ternary multiplication instruction (mult3), multiplication by the ternary multiplier 323 is carried out. Specifically, the ternary multiplier 323 multiplies the eight pieces of 2-bit wide ternary data stored in the register r0 by the respective eight pieces of 2-bit wide ternary data stored in the register r3 in parallel. The result of the multiplication in the ternary multiplier 323 (eight pieces of 2-bit wide ternary data) is stored in the register r5.

In the fourth cycle, in response to a dedicated bit count instruction (bcount3), processing by the ternary bit counter 325 is carried out. Specifically, the ternary bit counter 325 counts each of the number of even-number bits indicating 1 and the number of odd-number bits indicating 1 of the result of the multiplication in the ternary multiplier 323 stored in the register r5, and then subtracts the number of odd-number bits indicating 1 from the number of even-number bits indicating 1. This result of subtraction corresponds to the inner product operation result of eight elements and is stored in the register r6.

In the fifth cycle, the inner product operation result of the eight elements stored in the register r6 is accumulatively added to the value of the register r7 (initial value is 0).

In the sixth cycle, 1 is added to the offset value stored in the register r2. It is therefore possible to read out the next eight elements.

In the seventh cycle, it is determined whether the offset value stored in the register r2 has reached a predetermined value. That is, it is determined whether the inner product has been performed on all the 128 elements forming each input data. When the inner product has not been performed on at least one of the 128 elements, the process goes back to the first cycle. On the other hand, when the inner product has been performed on all the 128 elements, the process goes to the next processing. Since the number of elements is 128, the word length L is 16, and eight elements are stored in one word in this example, processing of the first to seventh cycles is repeated 16(=128/8)) times in total. The inner product operation result of the 128 elements is eventually stored in the register r7.

Since the processing of the first to seventh cycles is repeated 16 times, the total number of cycles is 7×16=112 cycles.

As stated above, the image recognition processor 32 is able to efficiently carry out the ternary inner product operation of two pieces of input data with the smaller number of cycles compared to the image recognition processor 22.

While the invention made by the present inventors has been specifically described based on the embodiments, it is needless to say that the present invention is not limited to the embodiments stated above and may be variously changed without departing from the spirit of the present invention.

For example, in the semiconductor device according to the above embodiments, the conductive type (p-type or n-type) of a semiconductor substrate, a semiconductor layer, a diffusion layer (diffusion region) and the like may be inverted. Accordingly, when one of the n-type and the p-type is represented by a first conductive type and the other one of the n-type and the p-type is represented by a second conductive type, the first conductive type may be the p-type and the second conductive type may be the n-type, or the first conductive type may be the n-type and the second conductive type may be the p-type.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A ternary inner product operation method using a processor and a memory coupled to the processor, the method comprising:
    storing, by the processor into the memory, a plurality of pieces of 2-bit wide ternary data to form a plurality of pieces of ternary data of each of first and second sets of input data indicating +1 when a first bit indicates a first value, indicating −1 when a second bit indicates the first value, and indicating 0 when both the first bit and the second bit indicate a second value;
    multiplying, by a ternary multiplication unit of the processor, respective elements of the first and second sets of input data to obtain the 2-bit wide ternary data;
    outputting, by a multiplication result processing unit of the processor, a number obtained by subtracting a number of pieces of the ternary data indicating −1 from a number of pieces of the ternary data indicating +1 of the plurality of pieces of ternary data forming a result of multiplication in the ternary multiplication unit as an inner product operation result, said outputting including:
        counting, by a first counter, a number of pieces of ternary data in which a first bit indicates a first value of the plurality of pieces of ternary data forming the result of the multiplication to specify the number of pieces of the ternary data indicating +1;
        counting, by a second counter, a number of pieces of ternary data in which a second bit indicates the first value of the plurality of pieces of ternary data forming the result of the multiplication to specify the number of pieces of the ternary data indicating −1; and
        subtracting, by a subtraction circuit, the number of pieces of the ternary data indicating −1 from the number of pieces of the ternary data indicating +1, by the processor, as the inner product operation result; and
    processing the inner product operation result and the 2-bit wide ternary data to obtain an operation result including an inner product of the first and second sets of input data.

2. A ternary inner product operation circuit for operating on a plurality of ternary data in a ternary format, the ternary data comprising a plurality of pieces of ternary data of each of first and second sets of input data formed by storing a plurality of pieces of 2-bit wide ternary data indicating +1 when a first bit indicates a first value, indicating −1 when a second bit indicates the first value, and indicating 0 when both the first bit and the second bit indicate a second value, the ternary inner product operation circuit comprising:
    a ternary multiplication unit multiplying respective elements of the first and second sets of input data to obtain 2-bit wide ternary data;
    a multiplication result processing unit that outputs a number obtained by subtracting a number of pieces of the ternary data indicating −1 from a number of pieces of the ternary data indicating +1 of the plurality of pieces of ternary data forming the result of the multiplication in the ternary multiplication unit as an inner product operation result, wherein the multiplication result processing unit comprises:
        a first counter that counts the number of pieces of the ternary data indicating +1 of the plurality of pieces of ternary data forming the result of the multiplication in the ternary multiplication unit;
        a second counter that counts the number of pieces of the ternary data indicating −1 of the plurality of pieces of ternary data forming the result of the multiplication in the ternary multiplication unit; and
        a subtraction circuit that subtracts a result of the count in the second counter from a result of the count in the first counter to obtain the inner product operation result; and
    a processor processing the inner product operation result and the 2-bit wide ternary data to obtain an operation result including an inner product of the first and second sets of input data.

3. The ternary inner product operation circuit according to claim 2, wherein the first counter counts the number of pieces of ternary data in which the first bit indicates the first value of the plurality of pieces of ternary data forming the result of the multiplication in the ternary multiplication unit to specify the number of pieces of the ternary data indicating +1, and
    wherein the second counter counts the number of pieces of ternary data in which the second bit indicates the first value of the plurality of pieces of ternary data forming the result of the multiplication in the ternary multiplication unit to specify the number of pieces of the ternary data indicating −1.

4. A semiconductor device, comprising:
    the ternary inner product operation circuit according to claim 2; and
    a memory storing the first and second sets of input data input to the ternary inner product operation circuit.

5. A non-transitory computer readable medium that causes a processor and a memory coupled to the processor to execute:
    storing, by the processor into the memory, a plurality of pieces of 2-bit wide ternary data to form a plurality of pieces of ternary data of each of first and second sets of input data indicating +1 when a first bit indicates a first value, indicating −1 when a second bit indicates the first value, and indicating 0 when both the first bit and the second bit indicate a second value;
    multiplying, by a ternary multiplication unit, respective elements of the first and second sets of input data to obtain the 2-bit wide ternary data;
    outputting, by a multiplication result processing unit, a number obtained by subtracting a number of pieces of the ternary data indicating −1 from a number of pieces of the ternary data indicating +1 of the plurality of pieces of ternary data forming a result of multiplication in the ternary multiplication unit as an inner product operation result, said obtaining including:
        first count processing, by a first counter, to count a number of pieces of ternary data indicating +1 of the plurality of pieces of ternary data forming the result of the multiplication by the multiplication processing;

second count processing, by a second counter, to count a number of pieces of ternary data indicating −1 of the plurality of pieces of ternary data forming the result of the multiplication by the multiplication processing; and subtraction processing, by a subtraction circuit, to subtract the number of pieces of the ternary data indicating −1 from the number of pieces of the ternary data indicating +1 to obtain the inner product operation result; and processing the inner product operation result and the 2-bit wide ternary data to obtain an operation result including an inner product of the first and second sets of input data.

6. The non-transitory computer readable medium according to claim 5, wherein the first counter counts the number of pieces of ternary data in which the first bit indicates the first value of the plurality of pieces of ternary data forming the result of the multiplication to specify the number of pieces of the ternary data indicating +1, and wherein the second counter counts the number of pieces of ternary data in which the second bit indicates the first value of the plurality of pieces of ternary data forming the result of the multiplication to specify the number of pieces of the ternary data indicating −1.

* * * * *